United States Patent
Tomosada et al.

(10) Patent No.: US 12,344,173 B2
(45) Date of Patent: Jul. 1, 2025

(54) SHEATH ASSEMBLY AND WIRE HARNESS (71) Applicant: Yazaki Corporation, Tokyo (JP)

(72) Inventors: Kosuke Tomosada, Shizuoka (JP); Akira Tsubaki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 209 days.

(21) Appl. No.: 18/459,826

(22) Filed: Sep. 1, 2023

(65) Prior Publication Data
US 2024/0083370 A1 Mar. 14, 2024

(30) Foreign Application Priority Data

Sep. 14, 2022 (JP) ................................ 2022-145826

(51) Int. Cl.
*B60R 16/02* (2006.01)
*H02G 3/04* (2006.01)
*H02G 11/00* (2006.01)

(52) U.S. Cl.
CPC ...... *B60R 16/0207* (2013.01); *B60R 16/0215* (2013.01); *H02G 3/0418* (2013.01); *H02G 11/00* (2013.01)

(58) Field of Classification Search
CPC .. B60R 16/0215; B60R 16/0222; H02G 3/32; H02G 3/0418; H02G 3/0437; H02G 11/00; H02G 11/06; H01B 13/01263
See application file for complete search history.

(56) References Cited

U.S. PATENT DOCUMENTS

| | | | | |
|---|---|---|---|---|
| 2,424,759 A | * | 7/1947 | Klumpp, Jr. | H02G 3/0675 174/153 G |
| 3,428,856 A | * | 2/1969 | Jones | H04N 3/1856 315/369 |
| 3,449,687 A | * | 6/1969 | Evel | H03F 3/45381 330/253 |
| 8,586,880 B2 | * | 11/2013 | Zhang | H02G 3/083 174/650 |
| 11,895,814 B1 | * | 2/2024 | Lee | B60R 16/0215 |
| 2020/0112152 A1 | * | 4/2020 | Ide | H02G 3/0418 |
| 2020/0274130 A1 | * | 8/2020 | Chen | H01M 50/528 |
| 2022/0161742 A1 | * | 5/2022 | Saito | H01B 7/18 |

FOREIGN PATENT DOCUMENTS

| | | |
|---|---|---|
| JP | 2016082738 A | 5/2016 |
| JP | 2019-074153 A | 5/2019 |

* cited by examiner

*Primary Examiner* — Paresh Paghadal
(74) *Attorney, Agent, or Firm* — Sughrue Mion, PLLC (57) ABSTRACT

A sheath assembly applied to a wire harness includes: a protector that includes a base member to which a wiring material is inserted, and a cover member; and a movable sheathing material which is attached to the base member in a movable manner and to which the end part of the wiring material housed in a housing space part can be inserted. The cover member includes a positioning part that is formed to protrude toward the housing space part side in a state where the cover member is assembled to the base member and that maintains a connection state between the base member and the movable sheathing material by abutting against a connection part of the movable sheathing material to the base member.

3 Claims, 4 Drawing Sheets

SHEATH ASSEMBLY AND WIRE HARNESS

CROSS-REFERENCE TO RELATED APPLICATION(S)

The present application claims priority to and incorporates by reference the entire contents of Japanese Patent Application No. 2022-145826 filed in Japan on Sep. 14, 2022.

BACKGROUND OF THE INVENTION

1. Field of the Invention

The present invention relates to a sheath assembly and a wire harness.

2. Description of the Related Art

The related technologies are described, for example, in Japanese patent Application Laid-open No. 2019-74153 that discloses a cable chain (caterpillar-shaped movable sheathing material) in which a plurality of unit members (movable sheathing materials) are coupled in a relatively rotatable manner and wiring materials are inserted therein to hold the wiring materials in a bendable manner.

By the way, when the caterpillar-shaped movable sheathing material described in Japanese Patent Application Laid-open No. 2019-74153 is used while being attached to other sheathing materials such as a protector, there is room for further improvement in terms of maintaining the connection state with the protector while considering attachability to the protector.

SUMMARY OF THE INVENTION

The present invention is designed in view of the aforementioned circumstance, and it is an object thereof to provide a sheath assembly and a wire harness capable of properly maintaining the connection state between a protector and a movable sheathing material while considering the attachability of the movable sheathing material to the protector.

In order to achieve the above mentioned object, a sheath assembly according to one aspect of the present invention includes a protector that includes a base member including a housing space part that is formed with a wall part and in which a wiring material with conductivity is inserted along an axial direction and an opening part that allows the housing space part to communicate with outside, and a cover member that is capable of closing the opening part by being assembled to the base member; and a movable sheathing material that is attached to the base member in a movable manner and is capable of allowing an end part of the wiring material housed in the housing space part to be inserted into an inner side, wherein the cover member includes a positioning part that is formed to protrude toward the housing space part side in a state where the cover member is assembled to the base member where the movable sheathing material is being attached and that maintains a connection state between the base member and the movable sheathing material by abutting against a connection part of the movable sheathing material to the base member.

In order to achieve the above mentioned object, a wire harness according to another aspect of the present invention includes a wiring material with conductivity; and a sheath assembly sheathed onto the wiring material, wherein the sheath assembly includes: a protector that includes a base member including a housing space part that is formed with a wall part and in which the wiring material with conductivity is inserted along an axial direction and an opening part that allows the housing space part to communicate with outside, and a cover member that is capable of closing the opening part by being assembled to the base member; and a movable sheathing material that is attached to the base member in a movable manner and is capable of allowing an end part of the wiring material housed in the housing space part to be inserted into an inner side, and the cover member includes a positioning part that is formed to protrude toward the housing space part side in a state where the cover member is assembled to the base member where the movable sheathing material is being attached and that maintains a connection state between the base member and the movable sheathing material by abutting against a connection part of the movable sheathing material to the base member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment according to the present invention will be described in detail with reference to the accompanying drawings. Note, however, that the present invention is not limited by the embodiment. Furthermore, structural components in the following embodiment include those that can be easily replaced by those skilled in the art, or those that are substantially the same.

Embodiment

Figure 1:
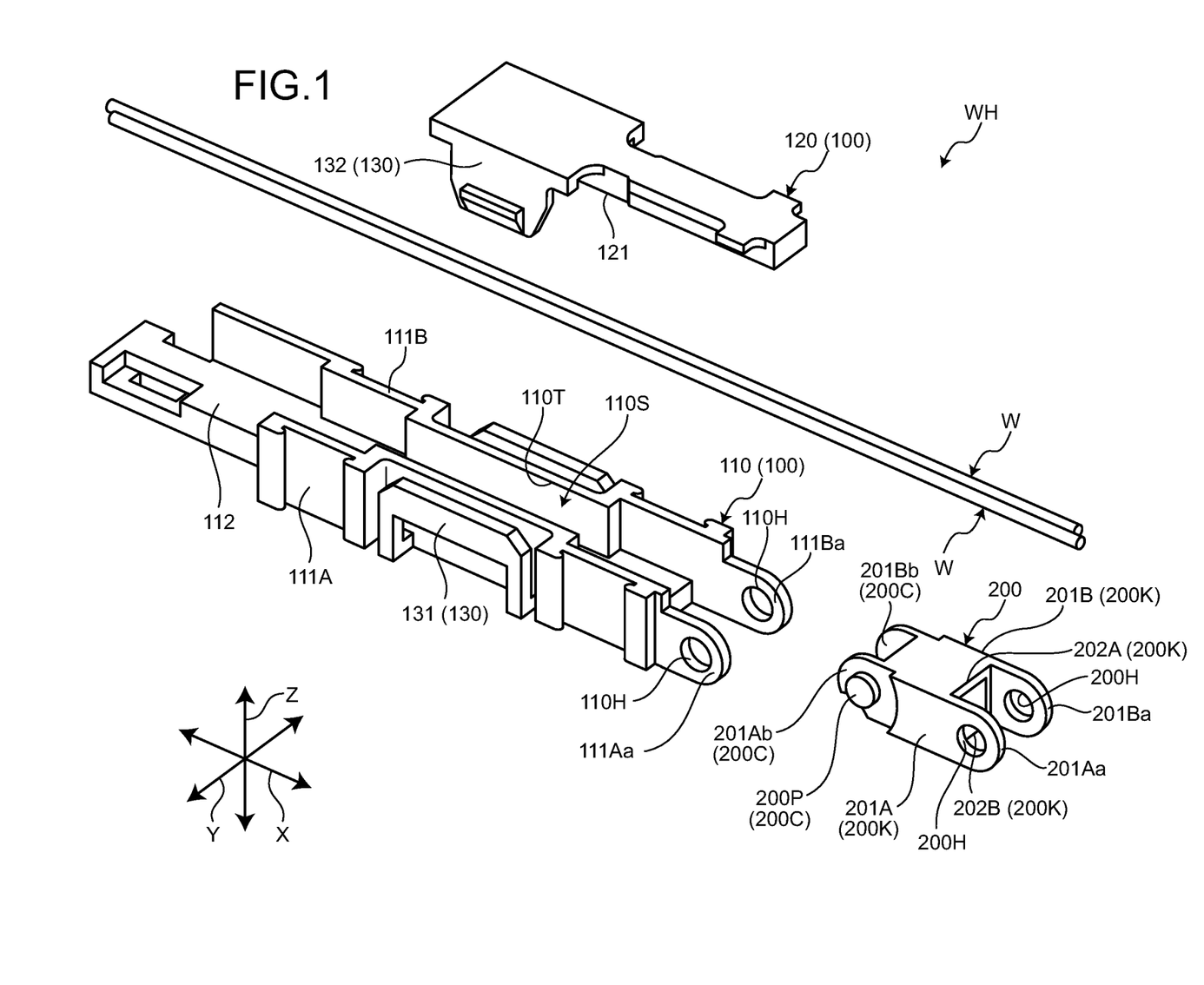
FIG. 1 is an exploded perspective view illustrating a schematic configuration of a wire harness to which a sheath assembly according to an embodiment is applied.

A wire harness WH illustrated in FIG. 1 is, for example, configured as an aggregate component formed with a bundle of a plurality of wiring materials W used for power supply and signal communication so as to connect the wiring materials W to each device by a connector or the like for connecting each of the devices loaded on a vehicle.

The wire harness WH includes the wiring materials W, and a sheath assembly 1 that is sheathed onto the wiring materials W. Furthermore, the sheath assembly 1 includes a protector 100, and a movable sheathing material 200 that is attached to the protector 100. Note that the wire harness WH and the sheath assembly 1 may further include a grommet, a fixture, a connector, and the like.

The wiring material W is, for example, an insulated electric wire with the core wire, which is a bundle of a plurality of conductive metal element wires, covered with an insulation coating part. Note that the wiring material W may be a bundle of a plurality of insulated electric wires. Furthermore, the wiring material W may be an insulated metal rod, which is a conductive metal rod covered with an insulation coating part.

The protector 100 is formed with an insulation resin material or the like, and protects the wiring materials W by housing the wiring materials W. The protector 100 is used as a member to regulate the routing path of the wiring materials W by being fixed to the vehicle. As illustrated in FIG. 1, the protector 100 includes a base member 110 having a housing space part 110S to which the wiring materials W are inserted, and a cover member 120 that is assembled to the base member 110.

The movable sheathing material 200 is formed with an insulation resin material or the like, a large number of which are coupled to form a caterpillar-like structure. The movable sheathing material 200 is attached to an end part of the protector 100 in a movable manner, and allows the wiring materials W to be inserted inside thereof to protect the wiring materials W. For convenience of explanation, only a single movable sheathing material 200, which is positioned at the end part of the caterpillar-shaped movable sheathing material 200 and attached to the protector 100, is illustrated in each of the drawings describing the present embodiment. The wiring materials W are connected to the movable components such as a sliding door, a sliding seat, and a sunroof, and the extending direction thereof changes in accordance with the movement of the corresponding movable components. The movable sheathing material 200 is used as a member that is capable of guiding the wiring materials W from the protector 100 to the movable component while holding the wiring materials W in a straight state or a bent state.

Furthermore, the sheath assembly 1 according to the present embodiment has a positioning part 121 provided in a cover member 120, as a structure for maintaining the connection state between the protector 100 and the movable sheathing material 200. Furthermore, the sheath assembly 1 implements a configuration capable of properly maintaining the connection state between the protector and the movable sheathing material while considering the attachability of the movable sheathing material 200 to the protector 100, by assembling the cover member 120 such that the positioning part 121 abuts against the connection part with the base member 110 of the movable sheathing material 200. Hereinafter, each structure of the sheath assembly 1 will be described in detail by referring to FIG. 1 to FIG. 3.

In the description hereinafter, in regards to a first direction, a second direction, and a third direction intersecting with each other, the first direction is referred to as a "length direction X", the second direction as a "width direction Y", and the third direction as a "height direction Z". The length direction X, the width direction Y, and the height direction Z are orthogonal to each other. The length direction X typically corresponds to the axial direction of the wiring material W inserted into the protector 100, and an attachment direction of the movable sheathing material 200 with respect to the base member 110 of the protector 100 or the like. Furthermore, the height direction Z corresponds to an attachment/detachment direction of the cover member 120 with respect to the base member 110, and an opening direction of an opening part 110T (described later) of the base member 110 or the like. Unless otherwise noted, each of the directions used in the following description will be described as the direction in a state where each part of the sheath assembly 1 is assembled.

Furthermore, one side in the length direction X corresponds to the side where the movable sheathing material 200 is positioned, or the like, in a state where each part of the sheath assembly 1 is assembled. Moreover, the upper side in the height direction Z corresponds to the side where the cover member 120 of the protector 100 is positioned, or the like, in a state where each part of the sheath assembly 1 is assembled. The lower side in the height direction Z corresponds to the side where the base member 110 of the protector 100 is positioned, or the like, in a state where each part of the sheath assembly 1 is assembled.

Protector 100

Figure 2:
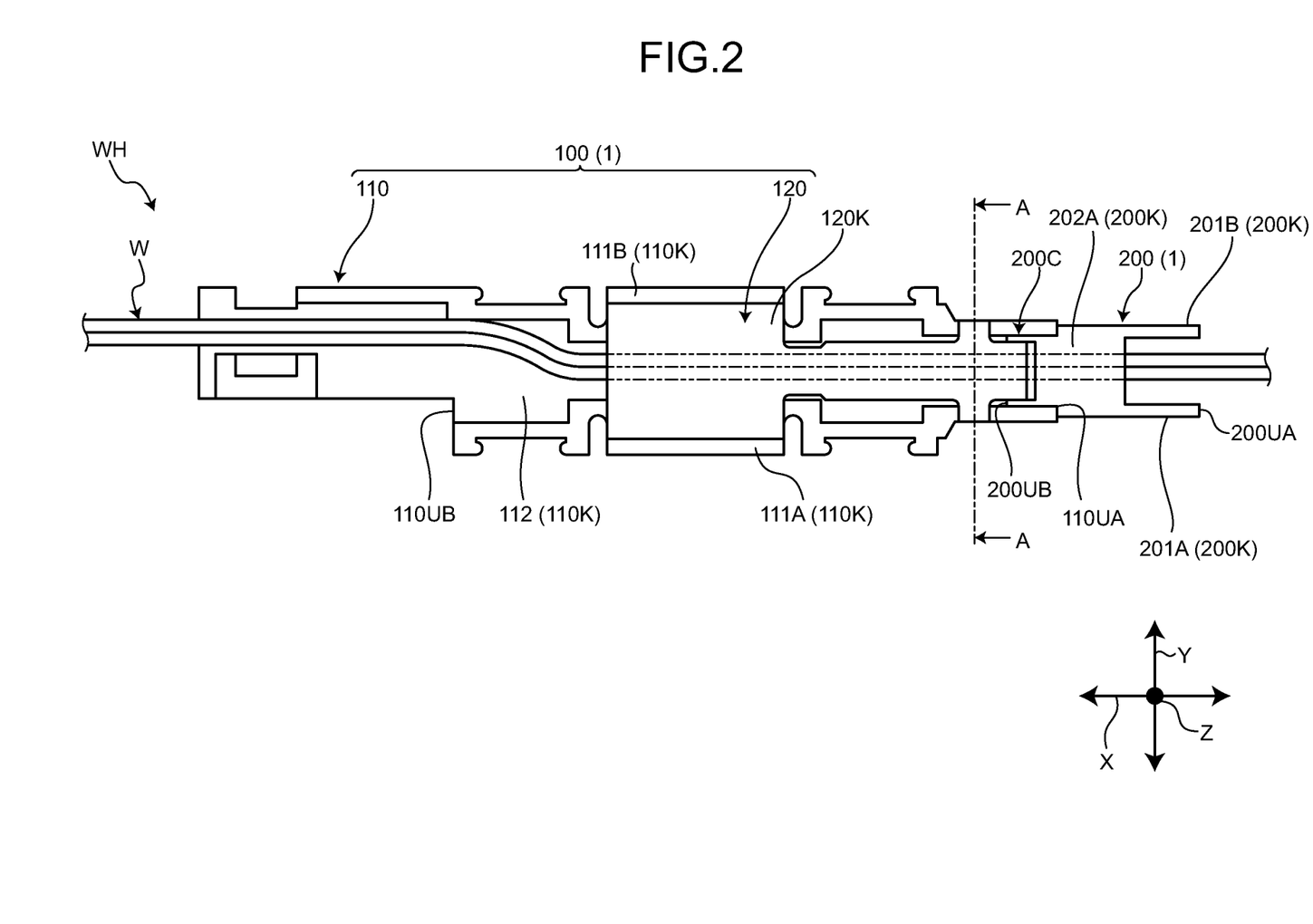
FIG. 2 is a top view illustrating a schematic configuration of the wire harness to which the sheath assembly according to the embodiment is applied.
Figure 3:
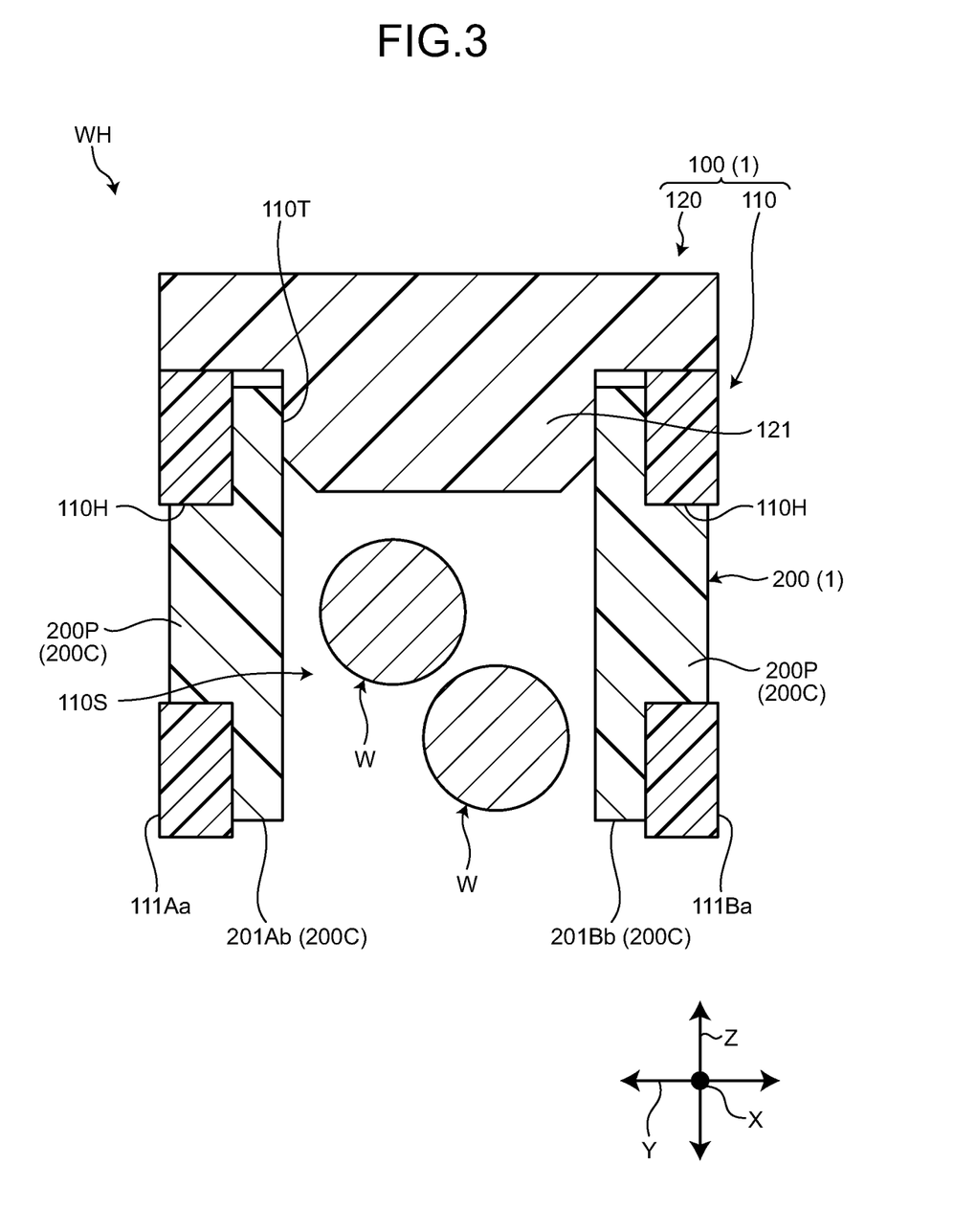
FIG. 3 is a sectional view illustrating a schematic configuration of the wire harness to which the sheath assembly according to the embodiment is applied.

As illustrated in FIG. 1 to FIG. 3, the base member 110 is configured including, as a wall part 110K, base member side sidewall parts 111A, 111B (hereinafter referred to simply as sidewall parts) and a bottom wall part 112. The base member 110 is formed integrally with the sidewall parts 111A, 111B and the bottom wall part 112, forming a U-shaped cross section along the height direction Z. Therefore, the base member 110 includes the housing space part 110S (see FIG. 1 and FIG. 3) as an interior space, the opening part 110T that opens in the height direction Z (see FIG. 1 and FIG. 3), and insertion opening parts 110UA, 110UB (see FIG. 2) that open in the length direction X.

The sidewall parts 111A and 111B extend along the length direction X and the height direction Z and are formed in a substantially rectangular plate shape with the width direction Y being the thickness direction, which are disposed by opposing to each other with a space provided therebetween along the width direction Y that intersects with the opening direction of the opening part 110T. Furthermore, each of the sidewall parts 111A and 111B may be formed in various shapes including a recessed portion, a protruded portion, a curved portion, or a bent portion, etc.

The bottom wall part 112 extends along the length direction X and the width direction Y and is formed in a substantially rectangular plate shape with the height direction Z being the thickness direction, which is disposed by opposing to the opening part 110T with a space provided therebetween along the height direction Z that is the opening direction of the opening part 110T. Furthermore, the bottom wall part 112 is positioned between the sidewall parts 111A and 111B with respect to the width direction Y, and both end parts thereof in the width direction Y are connected to the respective sidewall parts 111A and 111B. More specifically, the sidewall part 111A is erected along the height direction Z from one end part of the bottom wall part 112 in the width direction Y, and the sidewall part 111B is erected along the height direction Z from the other end part of the bottom wall part 112 in the width direction Y.

As illustrated in FIG. 1, the sidewall parts 111A, 111B according to the present embodiment are configured including: end parts 111Aa, 111Ba formed to protrude from one end of the bottom wall part 112 in the length direction X; and fitting hole parts 110H formed in each of the end parts 111Aa, 111Ba. The fitting hole part 110H is a hole part that is opened through along the width direction Y, and it is used as a part to be connected to a connection part 200C of the movable sheathing material 200, which will be described later.

The housing space part 110S is an area sectioned and formed by the sidewall parts 111A, 111B and the bottom wall part 112. The protector 100 according to the present embodiment is capable of routing the wiring materials W along the length direction X by inserting the wiring materials W into the housing space part 110S through the insertion opening parts 110UA and 110UB positioned at the end parts in the length direction X. Note that the housing space part 110S herein means the area that can hold the wiring materials W by any of the wall parts configuring the wall part 110K. Therefore, the housing space part 110S includes a space surrounded by a plurality of wall parts, a space sectioned by opposingly positioned wall parts, a space positioned along the wall face of one wall part, and the like.

The opening part 110T is the area sectioned and formed by a pair of sidewall parts 111A, 111B, and it is the area sandwiched by the end parts of each of the sidewall parts 111A, 111B positioned on the upper side in the height direction Z. In the protector 100 according to the present embodiment, when the cover member 120 is assembled to the base member 110, one side of the opening part 110T in the length direction X is blocked partially by the cover member 120, and one side of the housing space part 110S in the length direction X positioned by corresponding to the opening part 110T is partially covered. Therefore, the protector 100 includes: an area that holds the wiring materials W by housing the wiring materials W in the internal space surrounded by the wall part 110K of the base member 110 and a wall part 120K (described later) of the cover member 120; and an area that holds the wiring materials W only by the wall part 110K.

The insertion opening parts 110UA, 110UB are the areas sectioned and formed by the pair of sidewall parts 111A, 111B. The insertion opening part 110UA is sandwiched by the end parts on one side (right side in FIG. 2) of each of the sidewall parts 111A, 111B in the length direction X, and the insertion opening part 110UB is sandwiched by the end parts on the other side (left side in FIG. 2) of each of the sidewall parts 111A, 111B in the length direction X.

On the other hand, the cover member 120 is configured with the wall part 120K, as illustrated in FIG. 1 to FIG. 3. Furthermore, the cover member 120 is formed in a size capable of closing the opening part 110T of the base member 110 in the width direction Y in a state where the cover member 120 is assembled to the base member 110.

Furthermore, the cover member 120 is formed in a plate shape with the height direction Z being the thickness direction, in a state where the opening part 110T of the base member 110 is partially closed along the length direction X (see FIG. 2 and the like). In this state, the cover member 120 is engaged to each of the sidewall parts 111A and 111B of the base member 110 via a locking mechanism 130. Therefore, the cover member 120 is held in a closing position for closing the opening part 110T of the base member 110, and it is positioned by opposing to the bottom wall part 112 with a space provided therebetween along the height direction Z.

Note that the locking mechanism 130 is configured including: a plurality of locking pieces 131 provided to each of the sidewall parts 111A and 111B of the base member 110; and locked pieces 132 provided to the cover member 120 to correspond to each of the locking pieces 131 (see FIG. 1, FIG. 3, and the like). The base member 110 can lock the cover member 120 via the locking mechanism 130 by engaging protruded parts formed in the locked pieces 132 of the cover member 120 with hole parts formed in each of the locking pieces 131.

Next, the configuration of the positioning part 121 provided in the cover member 120 will be described.

The positioning part 121 is a protruded part formed to protrude from the inner face side of the cover member 120. The positioning part 121 extends along the length direction X and extends across between the pair of sidewall parts 111A and 111B with respect to the width direction Y in a state where the cover member 120 is assembled to the base member 110. Furthermore, the positioning part 121 is formed along each of the sidewall parts 111A and 111B with respect to the height direction Z in a state where the cover member 120 is assembled to the base member 110.

Movable Sheathing Material 200

As illustrated in FIG. 1 to FIG. 3, the movable sheathing material 200 is configured including, as a wall part 200K, a pair of movable sheathing material side sidewall parts 201A, 201B (hereinafter referred to simply as sidewall parts) and a pair of coupling wall parts 202A, 202B. The movable sheathing material 200 is formed in a tubular shape integrally with the sidewall parts 201A, 201B and the coupling wall parts 202A, 202B. Therefore, the movable sheathing material 200 includes a housing space part 200S (see FIG. 1) as an interior space, and insertion opening parts 200UA, 200UB (see FIG. 2) that open in the length direction X. The caterpillar-shaped movable sheathing material 200 according to the present embodiment is movably attached to the end part of the protector 100, and it can be in a straight state or a bent state in accordance with the movement of the movable component to which the wiring materials W are connected. However, when describing each part of the movable sheathing material 200 in the following description, a case in which the movable sheathing material 200 extends along the length direction X (that is, in a straight state) is described for convenience.

The sidewall parts 201A and 201B, when attached to the base member 110, extend along the length direction X and the height direction Z and are formed in a plate shape with the width direction Y being the thickness direction, which are disposed by opposing to each other with a space provided therebetween along the width direction Y.

The coupling wall parts 202A and 202B extend along the length direction X and the width direction Y and are formed in a plate shape with the height direction Z being the thickness direction, which are disposed by opposing to each other with a space provided therebetween along the height direction Z. Furthermore, the coupling wall parts 202A, 202B are positioned between the sidewall parts 201A, 201B with respect to the width direction Y, and both end parts thereof in the width direction Y are connected to the respective sidewall parts 201A, 201B. More specifically, the sidewall part 201A is erected along the height direction Z from one end part of each of the coupling wall parts 202A and 202B in the width direction Y, and the sidewall part 201B is erected along the height direction Z from the other end part of each of the coupling wall parts 202A and 202B in the width direction Y.

The movable sheathing material 200 according to the present embodiment includes end parts of the sidewall parts 201A, 201B formed to protrude from each of the end parts of the coupling wall parts 202A, 202B in the longitudinal direction X, and the uneven parts formed in each of the end parts are used as the connection parts for the respective members.

More specifically, the sidewall parts 201A, 201B are configured including: end parts 201Aa, 201Ba formed to protrude toward one side (other movable sheathing material 200 side) in the length direction X when attached to the base member 110; and fitting hole parts 200H (see FIG. 1) formed respectively in the end parts. Furthermore, the sidewall parts 201A, 201B are configured including: end parts 201Ab, 201Bb formed to protrude toward the other side (the base member 110 side) in the length direction X when attached to the base member 110; and fitting protruded parts 200P (see FIG. 1) formed respectively in the end parts. Note that the end parts 201Ab, 201Bb are positioned by facing the end parts 111Aa, 111Ba of the pair of base member side sidewall parts 111A, 111B, and disposed by overlapping with the end parts 111Aa, 111Ba when attached to the base member 110. Therefore, the end parts 201Ab, 201Bb of one movable sheathing material 200 positioned at the end of the caterpillar-shaped movable sheathing material 200 and the fitting protruded parts 200P formed in the end parts 201Ab, 201Bb can be used as the connection parts 200C for the base member 110.

Note that the fitting hole part 200H is a hole part opened through along the width direction Y when attached to the base member 110, and it is used as a part to be connected to the fitting protruded part 200P formed in the other movable sheathing material 200.

Furthermore, the fitting protruded part 200P is a protruded part formed to protrude outward in the width direction Y (opposite side of the side where the housing space part 200S is positioned), when attached to the base member 110. The fitting protruded part 200P is configured to be capable of being inserted into each of the fitting hole part 110H formed in the base member 110 or the fitting hole part 200H formed in the other movable sheathing material 200, and it is used as the part to be connected to each member by being inserted into each hole part.

The housing space part 200S is an area sectioned and formed by the sidewall parts 201A, 201B and the coupling wall parts 202A, 202B. The movable sheathing material 200 according to the present embodiment is capable of routing the wiring materials W along the length direction X by inserting the wiring materials W into the housing space part 200S through the insertion opening parts 200UA and 200UB positioned at the end in the length direction X. Note that the housing space part 200S herein means the area that can hold the wiring materials W by any of the wall parts configuring the wall part 200K. Therefore, the housing space part 200S includes a space surrounded by a plurality of wall parts, a space sectioned by opposingly positioned wall parts, and the like.

The insertion opening parts 200UA, 200UB are the areas sectioned and formed by the pair of sidewall parts 201A, 201B. The insertion opening part 200UA is sandwiched by the end parts 201Aa, 201Ba (see FIG. 1) on one side of each of the sidewall parts 201A, 201B in the length direction X, and the insertion opening part 200UB is sandwiched by the end parts 201Ab, 201Bb (see FIG. 1) on the other side of the sidewall parts 201A, 201B in the length direction X.

Next, the operation when assembling the sheath assembly 1 will be described.

Figure 4:
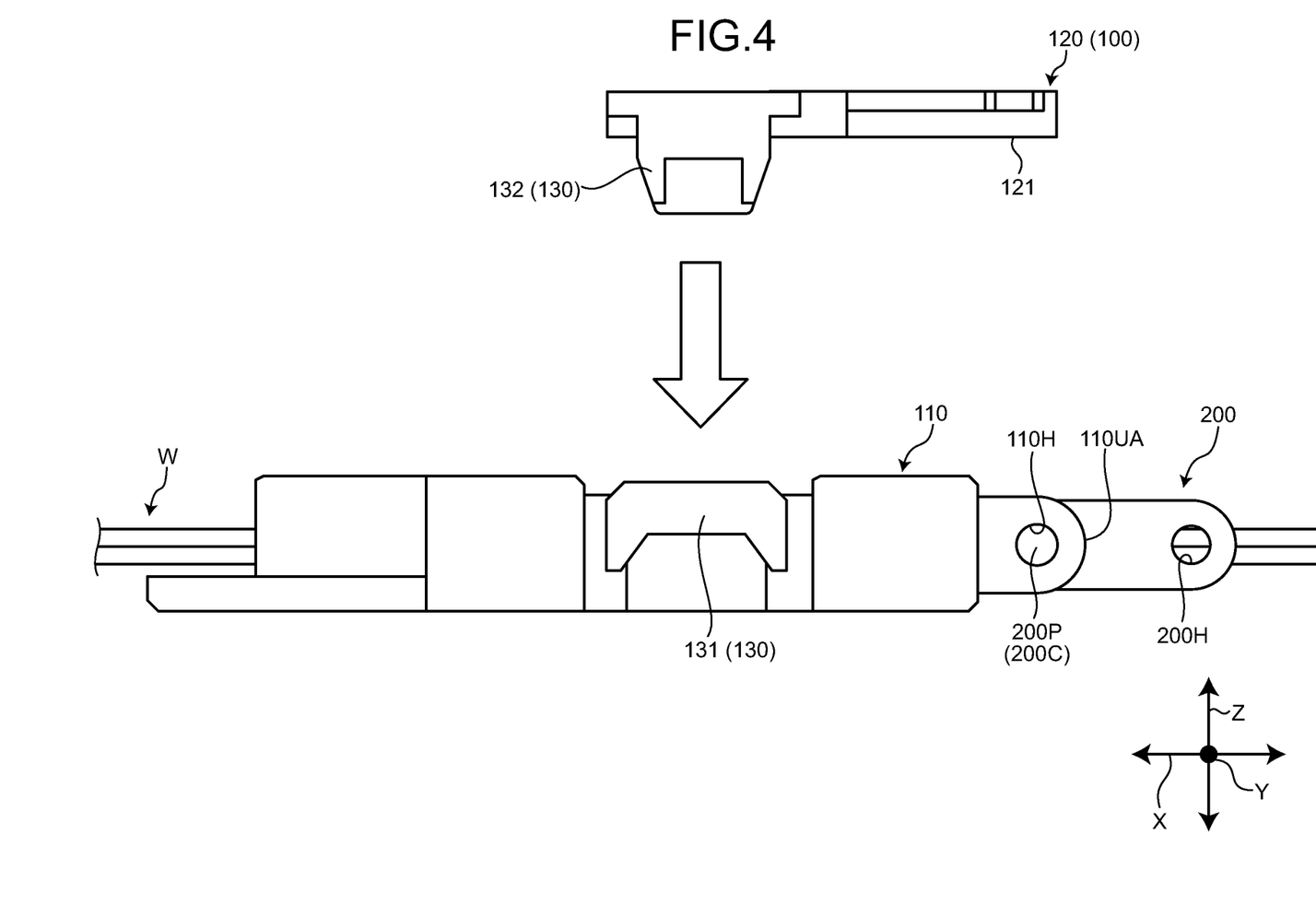
FIG. 4 is a diagram for describing an operation when assembling the sheath assembly according to the embodiment.

First, as illustrated in FIG. 4, an operator connects the connection parts 200C of one movable sheathing material 200 positioned at the end of the caterpillar-shaped movable sheathing material 200 to the end part of the base member 110 to attach the movable sheathing material 200 to the base member 110. At this time, in the movable sheathing material 200, by inserting the connection parts 200C from the insertion opening part 110UA side of the base member 110, the end parts 201Ab, 201Bb of the pair of sidewall parts 201A, 201B is disposed on the housing space part 110S side along the pair of sidewall parts 111A, 111B (see FIG. 3). Furthermore, the movable sheathing material 200 is movably attached to the base member 110 by inserting the fitting protruded parts 200P formed in the end parts 201Ab, 201Bb into the respective fitting hole parts 110H of the sidewall parts 111A, 111B positioned on the outer side of the sidewall parts 201A, 201B in the width direction Y. Furthermore, when the movable sheathing material 200 is attached to the base member 110 via the connection part 200C, the housing space part 200S and the housing space part 110S of the base member 110 can be communicated.

Then, the operator inserts the wiring materials W into the base member 110 and the caterpillar-shaped movable sheathing material 200, and assembles the cover member 120 to the base member 110 while each of the wiring materials W is being inserted into each of the housing space parts 110S and 200S. At this time, the positioning part 121 of the cover member 120, when inserted from the opening part 110T of the base member 110, is pushed in toward the bottom wall part 112 side, thereby being positioned protruding toward the housing space part 110S side while being assembled to the base member 110 (see FIG. 3). Furthermore, in the connection part between the base member 110 and the movable sheathing material 200, the positioning part 121 of the cover member 120 extends across between the pair of sidewall parts 201A, 201B positioned on the inner side of the sidewall parts 111A, 111B in the width direction Y, and extends along each of the sidewall parts 201A, 201B with respect to the height direction Z (see FIG. 3). Therefore, when the connection parts 200C of the movable sheathing material 200 attempt to deform in the direction coming off from the fitting hole part 110H, that is, toward the housing space part 110S side, the sheath assembly 1 can regulate such deformation by having the connection parts 200C abutted against the positioning part 121.

Furthermore, by closing the opening part 110T with the positioning part 121 with respect to the width direction Y (see FIG. 3), the sheath assembly 1 can prevent each of the wiring materials W housed in the housing space part 110S from moving toward the opening part 110T and popping out from the opening part 110T to the outside.

The wire harness WH described above includes the wiring materials W with conductivity, and the sheath assembly 1 that is sheathed onto the wiring materials W. The sheath assembly 1 includes: the protector 100 that includes the base member 110 having the housing space part 110S which is formed with the wall part 110K and into which the wiring materials W are inserted along the axial direction (length direction X), and the opening part 110T that allows the housing space part 110S to communicate with the outside, and the cover member 120 that is capable of closing the opening part 110T by being assembled to the base member 110; and the movable sheathing material 200 that is attached to the base member 110 in a movable manner, and capable of allowing the end parts of the wiring materials W housed in the housing space part 110S to be inserted to the inside thereof. Furthermore, the cover member 120 includes the positioning part 121 that is formed to protrude toward the housing space part 110S side in a state where the cover member 120 is assembled to the base member 110 to which the movable sheathing material 200 is being attached and that maintains the connection state between the base member 110 and the movable sheathing material 200 by abutting against connection parts 200C of the movable sheathing material 200 to the base member 110.

According to such a configuration, the wire harness WH and the sheath assembly 1 can regulate the deformation by having the positioning part 121 of the cover member 120 abutted against the connection parts 200C of the movable sheathing material 200, which attempt to deform toward the housing space part 110S side. Therefore, the wire harness WH and the sheath assembly 1 can properly maintain the connection state between the protector and the movable sheathing material.

More specifically, the wire harness WH and the sheath assembly 1 can properly maintain the connection state between the protector 100 and the movable sheathing material 200, while considering the attachability of the movable sheathing material 200 to the protector 100. In general, when a movable sheathing material is attached to an end of another sheathing material such as a protector, if the shape of the connection part of the movable sheathing material is determined solely by considering the attachability of the movable sheathing material, it may not be possible to sufficiently secure the fitting force generated with respect to the protector. Thus, the movable sheathing material, after being attached to the protector, tends to deform in the direction of coming off from the protector, resulting in having a problem of not being able to properly maintain the connection state with the protector. Therefore, the wire harness WH and the sheath assembly 1 according to the present embodiment overcomes such a problem by attaching the movable sheathing material 200 to the base member 110 and maintaining the connection state between the base member 110 and the movable sheathing material 200 by the positioning part 121 of the cover member 120 assembled to the base member 110. According to such a configuration, the wire harness WH and the sheath assembly 1 can sufficiently secure the connection strength between the protector 100 and the movable sheathing material 200 while improving the work efficiency of the operator.

Furthermore, the wire harness WH and the base member 110 of the sheath assembly 1 described above are configured including the pair of sidewall parts 111A and 111B (base member side sidewall parts) opposing to each other along the width direction Y that intersects with the height direction Z that is the opening direction of the opening part 110T. The movable sheathing material 200 includes the pair of sidewall parts 201A and 201B (movable sheathing material side sidewall parts) that oppose to each other along the width direction Y and are disposed on the housing space part 110S side along the pair of sidewall parts 111A, 111B in a state where the movable sheathing material 200 is attached to the base member 110. Furthermore, the pair of sidewall parts 111A, 111B include the respective fitting hole parts 110H that are positioned in the end parts 111Aa, 111Ba on one side of the length direction X and opened through along the width direction Y. The pair of sidewall parts 201A, 201B include the respective fitting protruded parts 200P that are positioned in the end parts 201Ab, 201Bb configuring the connection parts 200C, which are the end parts 201Ab, 201Bb on the base member 110 side. The fitting protruded parts 200P are formed to protrude toward the outer side in the width direction Y to be capable of being inserted into the fitting hole parts 110H.

Furthermore, the positioning part 121 includes the protruded part formed extending across between the pair of sidewall parts 201A, 201B with respect to the width direction Y and formed along each of the sidewall parts 201A, 201B with respect to the height direction Z that is the opening direction, in a state where the positioning part 121 is assembled to the base member 110 to which the movable sheathing material 200 is being attached.

According to such a configuration, when the connection parts 200C of the movable sheathing material 200 attempt to deform toward the housing space part 110S side positioned on the inner side in the width direction Y, the wire harness WH and the sheath assembly 1 can regulate such deformation by having the connection parts 200C abutted against the positioning part 121. Therefore, the wire harness WH and the sheath assembly 1 can properly maintain the connection state between the protector 100 and the movable sheathing material 200, while considering the attachability of the movable sheathing material 200 to the protector 100.

Note that the sheath assembly 1 and the wire harness WH according to the embodiment of the present invention described above are not limited to the embodiment described above, and various changes are possible within the scope of the appended claims.

For example, while the movable sheathing material 200 is described to include the fitting protruded parts 200P as the connection parts 200C with the base member 110 and the base member 110 is described to include the fitting hole parts 110H as the connection parts corresponding to the connection parts 200C, the relation between the hole parts and the protruded parts may be opposite.

The sheath assembly and the wire harness according to the present embodiment may be configured by combining the structural components of the embodiment described above as appropriate.

The sheath assembly and the wire harnesses according to the present embodiment achieve such an effect that the connection between the protector and the movable sheathing material can be maintained, while considering the attachability of the movable sheathing material for the protector.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A sheath assembly comprising:
    a protector that includes
        a base member including a housing space part that is formed with a wall part and in which a wiring material with conductivity is inserted along an axial direction and an opening part that allows the housing space part to communicate with outside, and
        a cover member that is capable of closing the opening part by being assembled to the base member; and
    a movable sheathing material that is attached to the base member in a movable manner and is capable of allowing an end part of the wiring material housed in the housing space part to be inserted into an inner side, wherein
    the cover member includes a positioning part that is formed to protrude toward the housing space part side in a state where the cover member is assembled to the base member where the movable sheathing material is being attached and that maintains a connection state between the base member and the movable sheathing material by abutting against a connection part of the movable sheathing material to the base member.

2. The sheath assembly according to claim 1, wherein
    the base member includes a pair of base member side sidewall parts opposing to each other along a width direction that intersects with an opening direction of the opening part,
    the movable sheathing material includes a pair of movable sheathing material side sidewall parts that are opposing to each other along the width direction and disposed on the housing space part side along the pair of base member side sidewall parts in a state where the movable sheathing material is attached to the base member, each of the pair of base member side sidewall parts includes a fitting hole part that is positioned at an end part on one side of the axial direction and opened through along the width direction, each of the pair of movable sheathing material side sidewall parts includes a fitting protruded part that is positioned in an end part on the base member side configuring the connection part, the fitting protruded part being formed to protrude toward an outer side in the width direction to be capable of being inserted into the fitting hole part, and the positioning part includes a protruded part that extends across between the pair of movable sheathing material side sidewall parts with respect to the width direction and is formed along each of the movable sheathing material side sidewall parts with respect to the opening direction in a state where the positioning part is assembled to the base member where the movable sheathing material is being attached.

3. A wire harness comprising:

a wiring material with conductivity; and a sheath assembly sheathed onto the wiring material, wherein the sheath assembly includes:

a protector that includes
- a base member including a housing space part that is formed with a wall part and in which the wiring material with conductivity is inserted along an axial direction and an opening part that allows the housing space part to communicate with outside, and
- a cover member that is capable of closing the opening part by being assembled to the base member; and a movable sheathing material that is attached to the base member in a movable manner and is capable of allowing an end part of the wiring material housed in the housing space part to be inserted into an inner side, and the cover member includes a positioning part that is formed to protrude toward the housing space part side in a state where the cover member is assembled to the base member where the movable sheathing material is being attached and that maintains a connection state between the base member and the movable sheathing material by abutting against a connection part of the movable sheathing material to the base member.

* * * * *